(12) United States Patent
Yagi (10) Patent No.: US 6,178,566 B1
(45) Date of Patent: Jan. 30, 2001

(54) TRANSPORTABLE WASTE COLLECTION AND TREATMENT TOILET SYSTEM

(75) Inventor: Hitoshi Yagi, Ishikawa-Ken (JP)

(73) Assignee: Nihon Shinko Co., Ltd. (JP)

( * ) Notice: Under 35 U.S.C. 154(b), the term of this patent shall be extended for 0 days.

(21) Appl. No.: 09/203,157

(22) Filed: Dec. 10, 1998

(30) Foreign Application Priority Data

Jun. 26, 1998 (JP) ................................. 10-180671

(51) Int. Cl.⁷ .................................................. E03D 5/016
(52) U.S. Cl. .......................... 4/317; 4/318; 4/319; 4/320; 4/321; 210/195.1
(58) Field of Search ............................... 4/317–321, 664, 4/663; 210/150, 151, 167, 195.1, 196

(56) References Cited

U.S. PATENT DOCUMENTS 3,598,236 * 8/1971 Nordlander et al. .................. 210/104
5,560,821 * 10/1996 Leo et al. .............................. 210/143

FOREIGN PATENT DOCUMENTS 3-100241 * 4/1991 (JP) .......................................... 4/317
8-277566 * 10/1996 (JP) .......................................... 4/317

* cited by examiner

Primary Examiner—Henry J. Recla
Assistant Examiner—Tuan Nguyen
(74) Attorney, Agent, or Firm—Brown, Raysman, Millstein, Felder & Steiner LLP (57) ABSTRACT

A toilet housing and waste collection and treatment system purify wastewater to a satisfactory level. When solid wastes are conveyed from individual toilets (31)–(33) into an active circulation chamber (16) in a toilet housing (10), the solid wastes are subjected to air exposure treatments in the active circulation chamber (16). The wastewater exposed to air in the active circulation chamber (16) is then purified through a three-phase flowing structure in first and second active water chambers (51) and (52), with the three-phase flowing structure including water, air, and carrier particles containing aerobic microorganisms. The wastewater so treated flows into first and second sediment separation chambers (53) and (54) where solid wastes are settled down and separated from the wastewater. The treated water is then supplied to a water reservoir (56) which in turns supplies the water to the respective toilets (31)–(33). Sediment settled at the bottom of the respective sediment separation chambers is fed and stored in a sediment storage chamber (55).

15 Claims, 7 Drawing Sheets

TRANSPORTABLE WASTE COLLECTION AND TREATMENT TOILET SYSTEM

BACKGROUND OF THE INVENTION

1. Technical Field

The present invention generally relates to waste collection and treatment toilet systems. More particularly, the present invention relates to transportable toilet housing.

2. Background Information

Conventional transportable toilets merely collect waste. These systems, therefore, must either be emptied regularly or connected to a sewer. Because transportable toilets are used in temporary or remote locations, it is often burdensome to empty collected sewage regularly. Transportable toilets are often used at temporary sites for sporting events, outdoor concerts, county fairs, sites of disasters and others. These toilets can only be used for a short period of time before the sewage has to be removed. Transportable toilets are also used in remote locations, such as military training camps. Where sewage connections are scarce, these toilets can only be used for a short time.

Japanese utility model registration No. 3,023,323 was issued to the inventor of this application for an improved and water-flushing type transportable temporary toilet systems. In that systems, filthy water including discharges from a plurality of toilet stools installed in a housing is cleaned of solid wastes through a sediment separation chamber and then purified through an active water chamber of a three-phase flowing structure consisting of water, air and carrier particles holding aerobic microorganisms. Such purified water is supplied to toilet stools to make them clean at all times. Therefore, the temporary toilet systems disclosed therein is of the water-flushing type which makes the systems clean, sanitary and free of odor.

However, the purifying treatment of the water in the above described systems is not complete, although the water is got rid of solid wastes through the sediment separation chamber and is purified through the three-phase flowing structure in the active water chamber. The treated water still contains solid materials such as scum. If the treated water is used as flushing water for toilet stools, then there would be risk that such solid materials including scum is attached to the toilet stools. Accordingly, the above described toilet systems are not necessarily perfect or appropriate for their intended purposes.

SUMMARY OF THE INVENTION

It is, therefore, an object of the present invention to provide a transportable toilet housing that is a self-contained unit.

It is another object of this invention to provide a transportable toilet housing that can be easily transported or installed.

It is another object of the present invention to provide a transportable toilet housing and waste collection and treatment systems which can purify filthy water to a highest degree of purity to permit higher efficient reuse and recycling of water.

It is still another object of the present invention to provide transportable toilet housing and waste collection and treatment systems which can keep toilet stools clean and sanitary at all times.

It is another object of the present invention to provide a transportable toilet housing and waste collection and treatment systems which can remove solid wastes including scum from treated water to prevent those solid wastes from being attached to toilet stools.

It is another object of this invention to provide a transportable toilet housing and waste collection and treatment systems which can address shortage or excess of water supply and regulate the flow of water through the use of electromagnetic valves.

It is yet another object of this invention to provide a transportable housing toilet that can be used simultaneously by many people over an extended period of time.

It is yet still another object of this invention to provide a transportable toilet housing that requires little maintenance.

It is another object of this invention to provide a transportable toilet housing and waste collection and treatment systems which can conserve water, and therefore be economical.

It is another object of this invention that it is possible to separate the men and women's rooms and freely structure the toilet house according to the purpose of its use.

Briefly, the present invention satisfies the above identified problems and overcomes these shortcomings through the provision of a transportable waste collection and treatment system. The toilets are directly connected to a chamber where waste is collected. This arrangement resolves the imbalance of excrement volume. The waste is then separated and removed from the water. This reduces the amount of waste that collects, allowing the toilets to be used over a long period of time. Further, water is conserved as it is treated and reused as flushing water. The toilets are also in a constant flushing state which eliminates the need for flushing tools, and consequently eliminates the problem of defective or broken flushing tools. Finally, the air dispersion system over-delivers air and prevents odor from rising out of the toilet discharge outlet.

According to a first embodiment of the present invention, there is provided a transportable toilet housing and waste collection and treatment system which comprises a housing, an active circulation chamber for receiving wastes thrown from toilet stools and exposing the wastes to air together with wastewater, an active water chamber for receiving the wastewater subjected to air exposing in the active circulation chamber and purifying the wastewater through a three-phase flowing structure including water, air and carrier particles holding aerobic microorganisms as filtering material, a sediment separation chamber for receiving the treated water purified in the active water chamber and settling down and separating solid materials from the treated water, a water reservoir for receiving the purified water after removed of the solid materials through the sediment separation chamber, means for supplying the treated water from the water reservoir to the toilet stools, and a sediment storage chamber for receiving and storing the solid materials settled down to a bottom of the sediment separation chamber, wherein the active circulation chamber, the active water chamber, the sediment separation chamber, the water reservoir and the sediment storage chamber is housed as a single unit within the housing and the toilet stools are also installed in the housing.

It is preferable to install a scum skimmer in the sediment separation chamber to remove scum floating on a surface of the processed water and to lead the removed scum to the active circulation chamber.

The interior of the housing is divided into a machine room containing the active water chamber, the sediment separation chamber, the water reservoir and the sediment storage chamber and a toilet room containing the toilet stools. The active circulation chamber is formed below the toilet room.

These, and other objects, features and advantages of this invention will become apparent from the following detailed description of the preferred embodiment taken in conjunction with the accompanying drawings.

BRIEF DESCRIPTIONS OF THE DRAWINGS

The subject matter which is regarded as the present invention is particularly pointed out and distinctly claimed in the concluding portion of the specification. The invention, however, both as to organization and method of practice together with the further objects and advantages thereof, may be best understood by reference to the following detailed description taken in conjunction with the accompanying drawings in which:

DETAILED DESCRIPTION OF THE PREFERRED EMBODIMENTS

Figure 1:
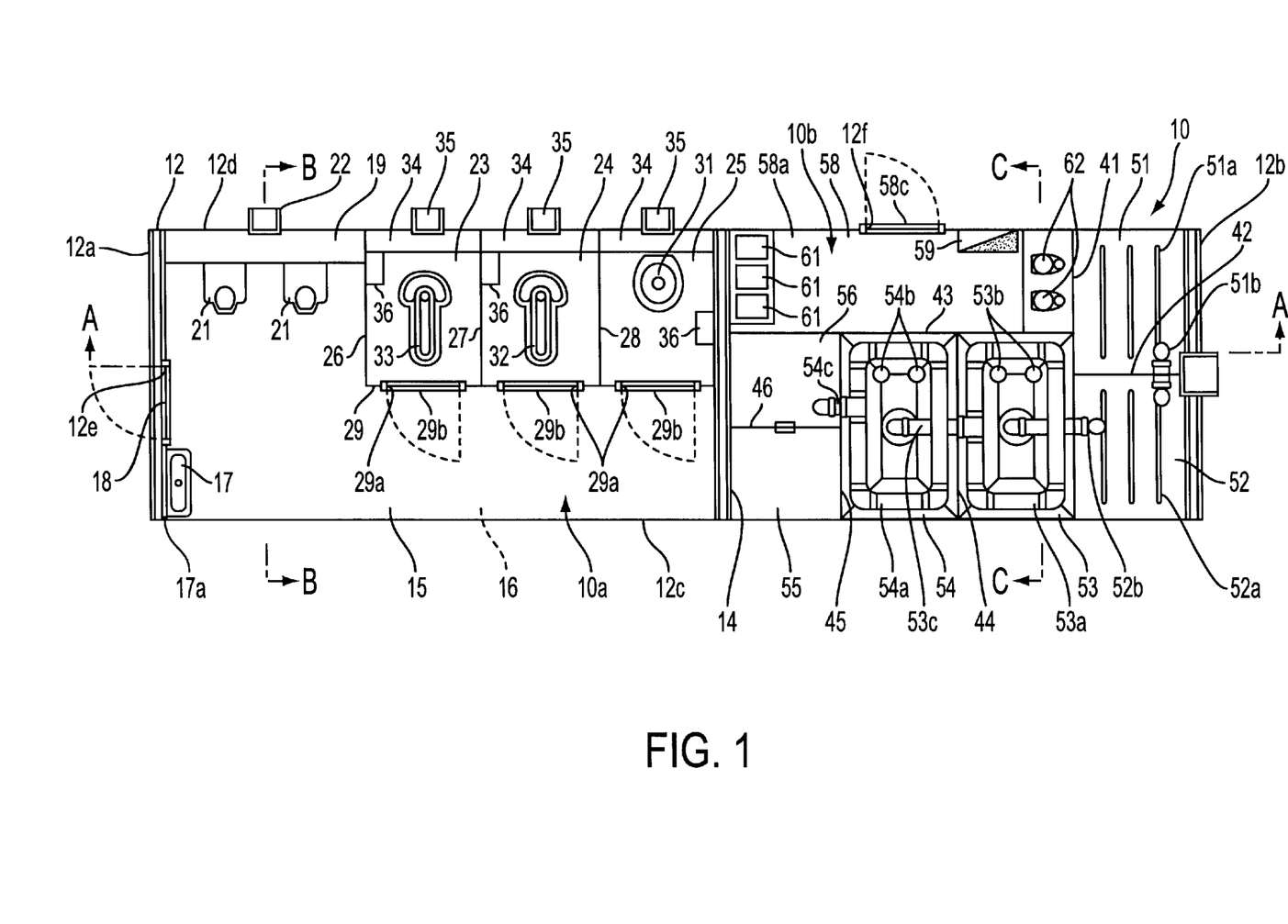
FIG. 1 is a top sectional view of a first embodiment of a waste collection and treatment system constructed in accordance with the principles of the present invention.
Figure 2:
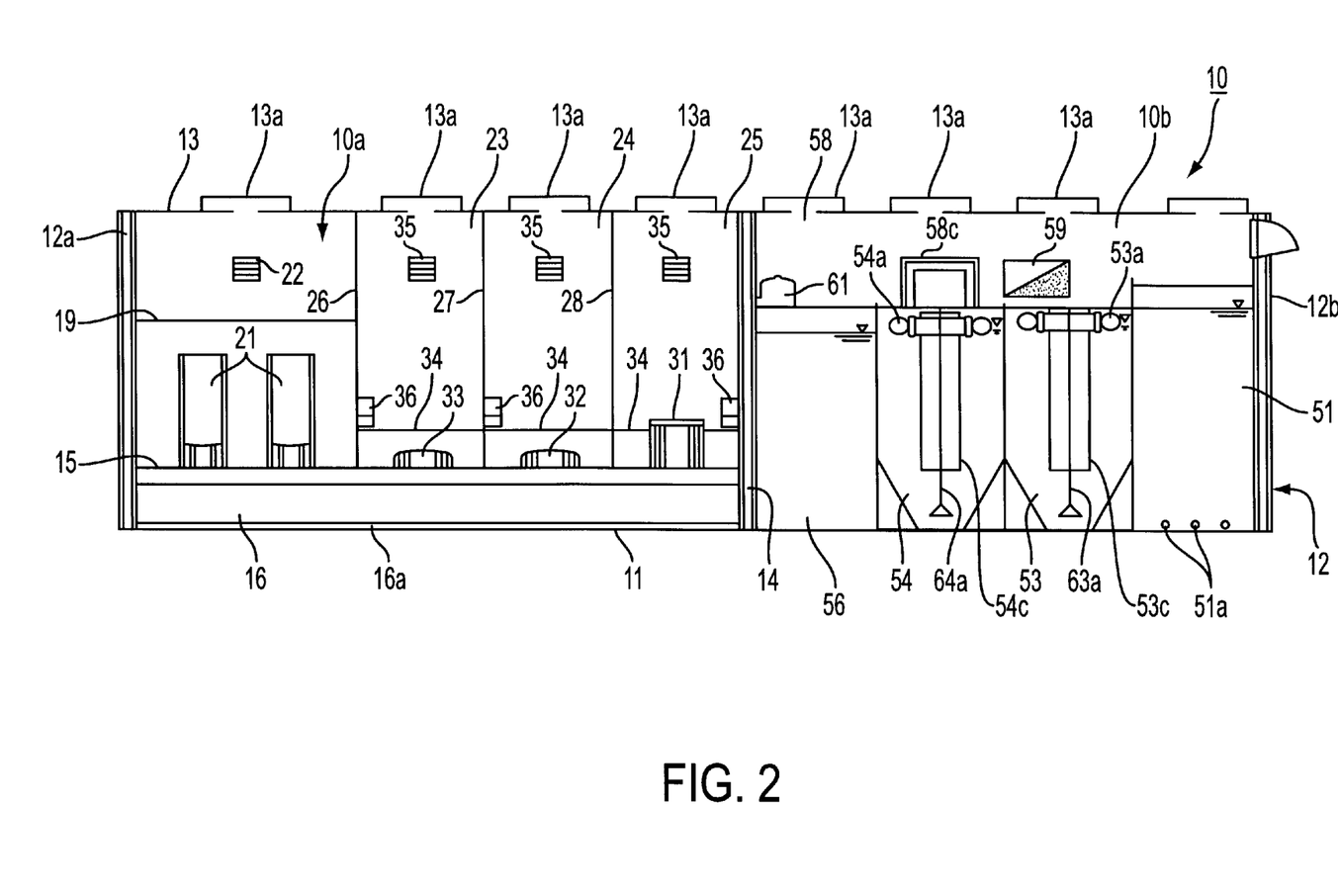
FIG. 2 is a cross sectional view taken along the line A—A in FIG. 1.
Figure 3:
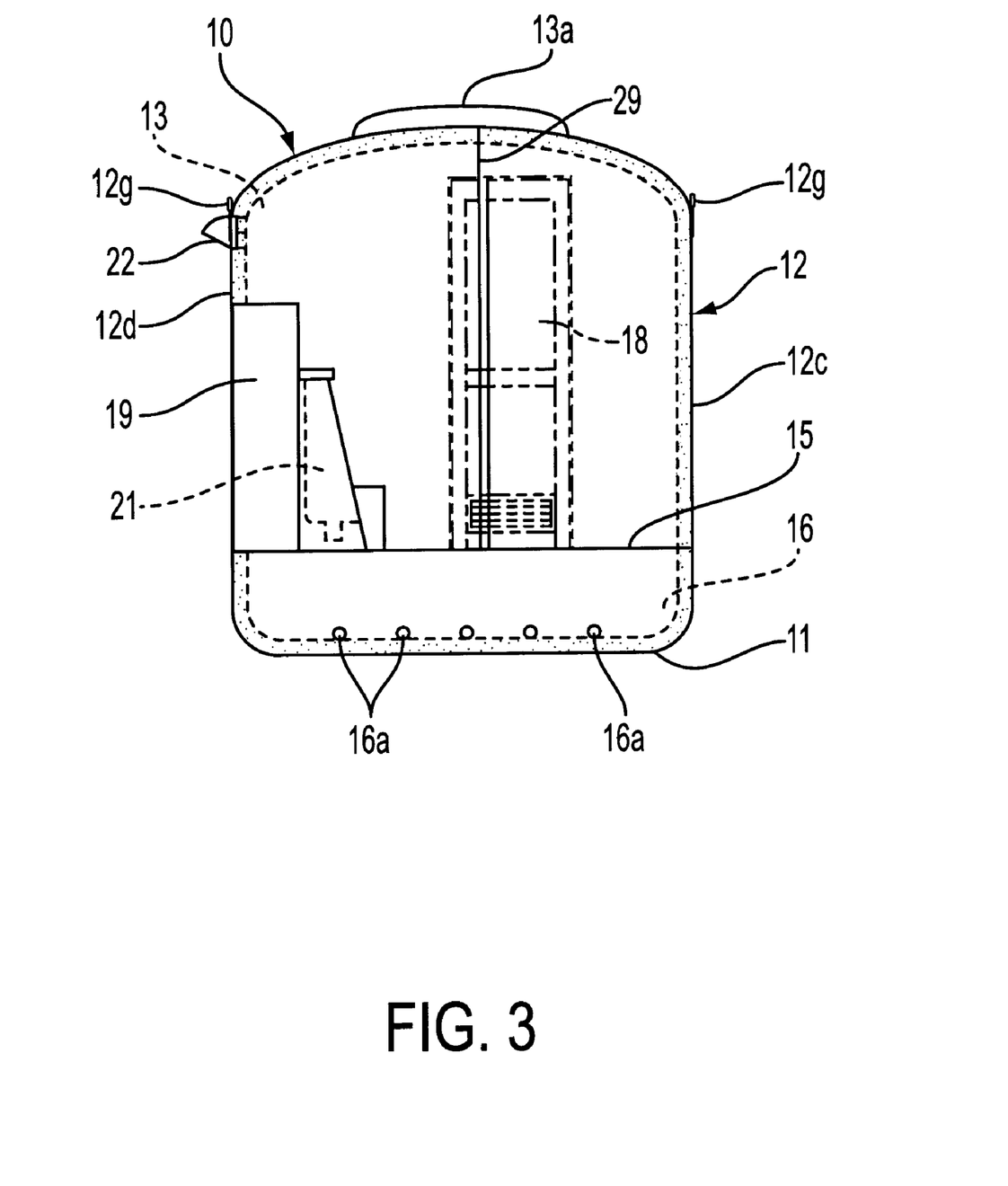
FIG. 3 is a cross sectional view taken along the line B—B in FIG. 1.
Figure 4:
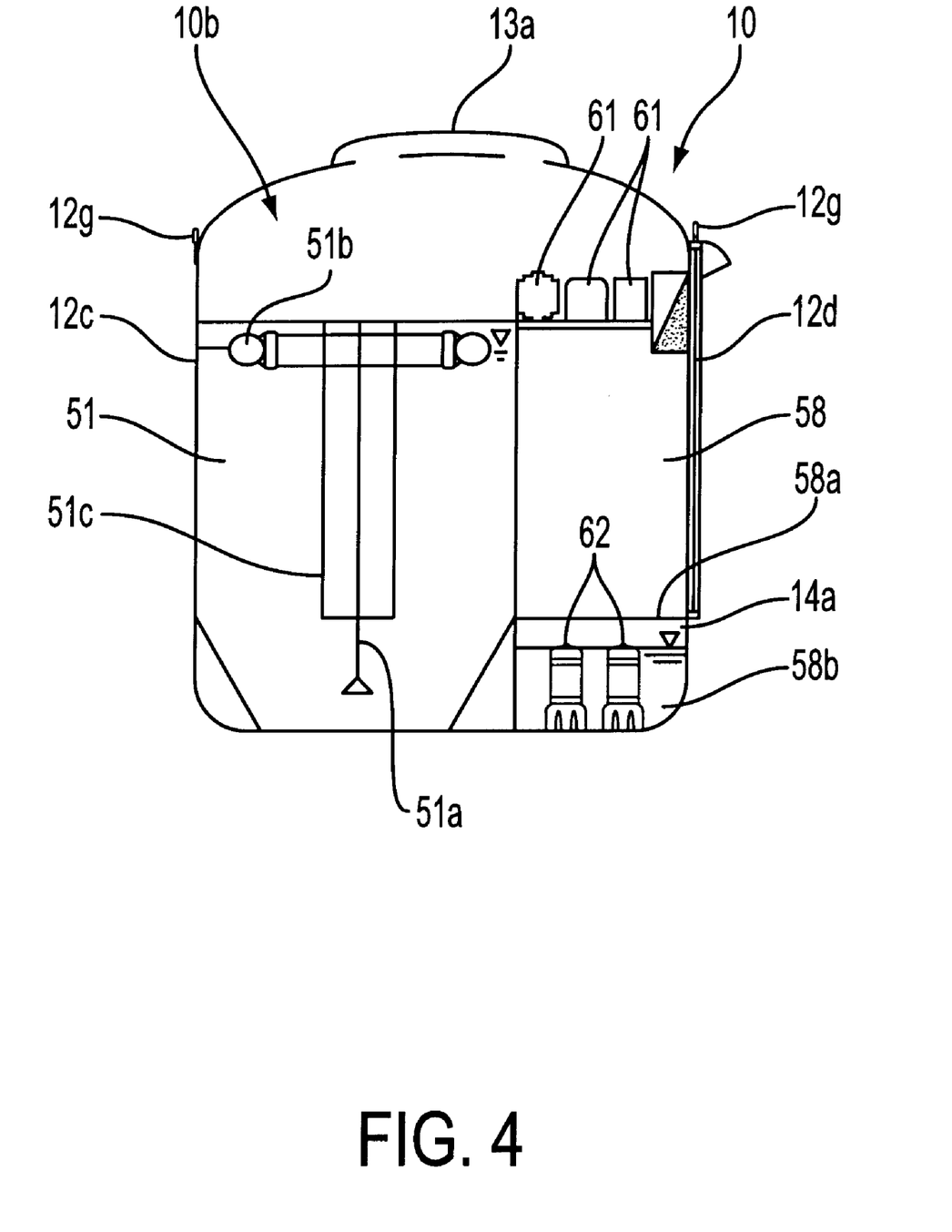
FIG. 4 is a cross sectional view taken along the line C—C in FIG. 1.

Referring to the drawings, there are illustrated several embodiments of a transportable toilet housing and waste collection and treatment system according to the principles of the present invention. FIG. 1 is a top sectional view of the first embodiment of the waste collection and treatment system; FIG. 2 is a cross sectional view taken along the line A—A in FIG. 1; FIG. 3 is a cross sectional view taken along the line B—B in FIG. 1; and FIG. 4 is a cross sectional view taken along the line C—C in FIG. 1. The illustrated toilet system has a housing 10 of a hollow rectangular shape with a length of 8,200 mm and a width of 2,200 mm, for example. As seen in FIG. 3, the housing 10 has a horizontal bottom wall 11, an outer shell 12 standing vertically in a manner to enclose the outer periphery of the bottom wall 11, and a ceiling wall 13 for closing an upper opening in the outer shells 12. The ceiling wall 13 has an upwardly projected arc-shaped portion in its middle in a direction of its width. The housing 10 is made of fiberglass reinforced plastic (FRP) which is partially reinforced with steel.

The outer shell 12 consist of a pair of laterally extending walls 12a and 12b and a pair of longitudinally extending walls 12c and 12d. At one of the walls 12a there is formed an entrance 12e which is opened and closed with a door 18. Hanging fixtures 12g (see FIG. 3) are attached along upper edges of the longitudinal walls 12c and 12d.

The interior of the housing 10 is divided into a toilet room 10a and an equipment room 10b by a separation wall 14 extending laterally about at the center of the housing 10. In the toilet room 10a, a horizontally extending floor wall 15 is fixed approximately 500 mm over the whole of the bottom wall 11. A space defined by the floor wall 15 and the bottom wall 11 forms an active circulation chamber 16. A sink 17 and a vanity mirror 17a are installed at one of the lateral walls 12a forming the toilet room 10a.

A shelf 19 is assembled at a predetermined height along the side wall 12d in the toilet room 10a, extending a predetermined length from the side wall 12a of the outer shell 12. A pair of urinals 21 are installed at a predetermined spacing along the longitudinal direction of the side wall 12d in the neighborhood of the shelf 19. The respective urinals 21 are fixed over the floor wall 15 and connected to the active circulation chamber 16 below the floor wall 15. A ventilator 22 is secured at an upper level of the side wall 12d over the shelf 19.

There are also three individual stairs 23, 24 and 25 between the shelf 19 and the partition wall 14, with the individual stalls 23, 24 and 25 being defined by three lateral partitions 26, 27 and 28 extending normal to the side wall 12d and a single longitudinal partition 29 extending along the longitudinal direction of the housing 10. There are formed entrances 29a for the individual stalls 23, 24 and 25, the entrances being opened or closed by doors 29b.

A water-flushing type Western-style toilet 31 is installed over the floor wall 15 in the stall 25 next to the partition wall 25, whereas water-flushing Japanese-style toilets 32 and 33 are installed over the floor wall 15 in the other two stalls 23 and 24. The Western-style toilet 31 and the Japanese-style toilets 32 and 33 are open to the active circulation chamber 16 below the floor wall 15.

Air dispersion tubes 16a are arranged in the active circulation chamber 16, to which air is supplied by blowers 61 discussed below. Wastewater, including solid wastes, which is thrown from the urinals 21, the western-style toilet 31 and the Japanese-style toilets 32 and 33 into the active circulation chamber 16 is exposed to air constantly flowing out of the air dispersion tubes 16a.

Each of the stalls 23, 24 and 25 has a relatively low shelf 34 extending along the side wall 12d and a ventilator 35 over the shelf 34. A paper holder 36 is also installed at an appropriate level in each of the stalls 23, 24 and 25.

In the middle of the ceiling wall 13 of the housing 10, there are formed an opening 13a for each of the stalls 23, 24 and 25 for lighting and ventilation. There are also formed a lighting and ventilating opening 13a in the middle of the ceiling wall 13 for a couple of the urinals 21. It is further noted that there are formed four lighting and ventilating openings 13a at an appropriate spacing along the longitudinal direction of the housing in the center of the ceiling wall 13 of the housing 10 inside the equipment room 10b.

As seen in FIG. 1, the equipment room lob in the housing 10 is divided by a first vertically extending partition 41 which is parallel to one of the end walls 12b in the shell 12. A first space between the first partition 41 and the end wall 12b is divided into first and second active water chambers 51 and 52 by a second vertically extending partition 42.

A second space between the first partition 41 parallel to the end wall 12b and the separation wall 14 is divided by a third partition 43 which is parallel to the side wall 12d. The third partition 43, the separation wall 14, the first partition 41 and the side wall 12d forms a machine room 58. A third space defined by the side wall 12c of the housing 10, the third partition 43, the first partition 41 and the separation wall 14 is divided into three equal rooms by a couple of laterally extending partitions (fourth partition 44 and fifth partition 45). A space defined by the first partition 41, the third partition 43 and the fourth partition 44 forms a first sediment separation chamber 53, whereas a space defined by the fourth partition 44, the fifth partition 45, the third partition 43 and the side wall 12*c* forms a second sediment separation chamber 54.

A fourth space between the fifth partition 45 and the separation wall 14 is divided into two by a sixth partition 46. A space defined by the side wall 12*c,* the separation wall 14, the sixth partition 46 and the side wall 12*c* forms a sediment storage chamber 55, while one defined by the third partition 43, the separation wall 14, the sixth partition 46 and the third partition 43 forms a water reservoir 56.

It is to be noted that there are secured gaps or spaces between upper ends of the first through sixth partitions 41–46 and the ceiling wall 13.

Disposed between the side wall 12*d* and the third partition 43 there is a floor wall 58*a* in the machine room 58 formed adjacent to the separation wall 14, with the floor wall 58*a* being at the same level as the floor wall 15 in the toilet room 10*a*. The floor wall 58*a* is disposed to cover the whole of the machine room 58 except its edge portion adjacent to the first active water chamber 51. There is formed a water convey chamber 58*b* between the floor wall 58*a* and the bottom wall 11 of the housing 10. The water convey chamber 58*b* is open to the active circulation chamber 16 formed below the toilet room 10*a* via holes 14*a*(see FIG. 4) in the separation wall 14. A couple of water pumps 62 are installed at an edge portion of the water convey chamber 58*b* adjacent to the first active water chamber 51 to pump wastewater including solid wastes from the water convey chamber 58*b* to the first active water chamber 51.

There is formed an entrance 12*f* in the side wall 12*d* of the machine room 58 approximately in the center of the machine room 58 along its longitudinal direction, which entrance 12*f* being opened and closed by door 58*c*. Three blowers 61 are installed along the separation wall 14 in the machine room 58. Further, a control panel 59 is disposed at an upper level of the side wall 12*d* in the machine room 58.

Air dispersion tubes 51*a* are fixed at a lower level in the first active water chamber 51 to which the wastewater is supplied through the couple of the water pump 62 in the water convey chamber 58*b*. With the aid of the blowers 61 in the machine room 58, air is supplied to the air dispersion tubes 51*a* at all times. Carrier particles holding aerobic microorganisms, such as active carbon, are introduced into the first active water chamber 51. The wastewater is treated in the first active water chamber 51 through a three-phase structure including not only the carrier particles but also water and air.

The wastewater treated in the first active water chamber 51 is then supplied to a second active water chamber 52 via a connection pipe 51*b*. Air dispersion tubes 52*a* are also installed at a lower level of the second active water chamber 52, to which air is supplied by the blowers 61 in the machine room 58 at all times. The carrier particles holding aerobic microorganisms, such as active carbon, are also introduced into the second active water chamber 52. The wastewater is likewise treated in the second active water chamber 52 through a similar three-phase structure including the carrier particles, water and air.

The wastewater treated through the second active water chamber 52 is thereafter fed to the first sediment separation chamber 53 by way of a connection pipe 52*b*. The wastewater treated for purifying process by the sediment separation chamber 53 is then fed to the second sediment separation chamber 54.

Figure 6:
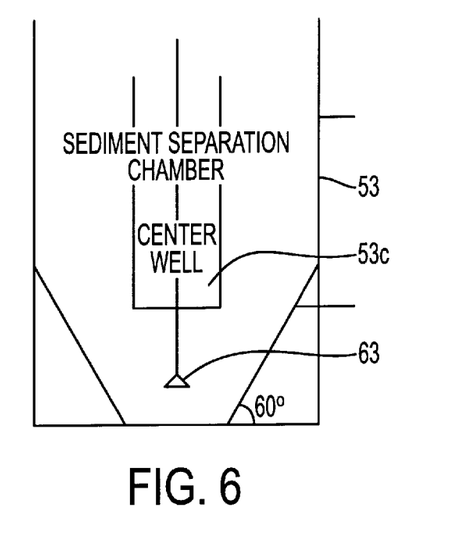
FIG. 6 is a cross sectional view depicting a hopper installed in a sediment separation chamber as shown in FIG. 1.

The first and second sediment separation chambers 53 and 54 are of a hopper shape of a gradually smaller cross sectional area in the descending direction at their lower portions. The angle of the hopper shape is preferably at 60 degrees at the bottom thereof with respect to a horizontal plane. See FIG. 6 for more details. In other words, 60 degrees or more of angle of the hopper shape is necessary for sediments settled down to the bottom of the first and second sediment separation chambers 53 and 54 to freely flow. The hopper shape should be finished to permit smooth travel of the sediment along its surface.

Cylinders 53*c* and 54*c* are secured in core portions of the first and second sediment separation chambers 53 and 54 to accommodate inlet tubes 63*a* and 64*a* of air lift pumps 63 and 64 (see "AP" in FIG. 5) which pump up the sediments settled to the bottom of the first and second sediment separation chambers 53 and 54. Lower ends of the inlet tubes 63*a* and 64*a* having inlet openings are positioned near the bottom of the first and second sediment separation chambers 53 and 54. The function of the air lift pumps 63 and 64 is to convey the sediment settled down to the bottom of the first and second sediment separation chambers 53 and 54 to the sediment storage chamber 55 by feeding the air from the blowers 61 in the machine room 58 into the inlet tubes 63*a* and 64*a* and thus reducing the specific gravity of the wastewater in the inlet tubes 63*a* and 64*a*.

Within the first and second sediment separation chambers 53 and 54 there are disposed scum skimmers 53*b* and 54*b* of a float type for collection of scum floating on the treated water. The respective scum skimmers 53*b* and 54*b* are designed to suck and collect the scum floating on the treated water into the middle of the skimmers through the use of the blowers 61 in the machine room 58. The scum collected through the scum skimmers 53*b* and 54*b* is fed back to the active circulation chamber 16 below the toilet room 10*a* and exposed to air again. Structures of the scum skimmers are illustrated in FIGS. 7A and 7B.

Figure 7A:
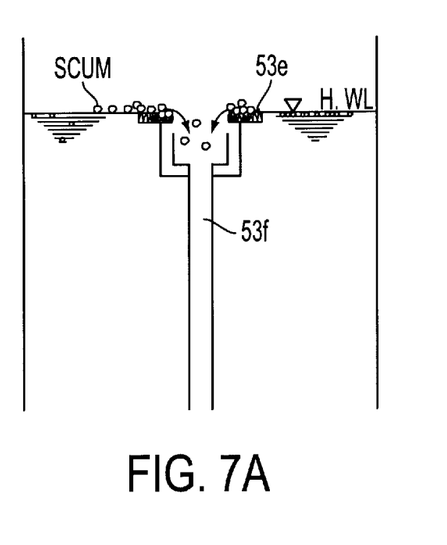
FIGS. 7A and 7B are cross sectional views depicting a scum skimmer mechanism installed in the sediment separation chamber in FIG. 1.
Figure 7B:
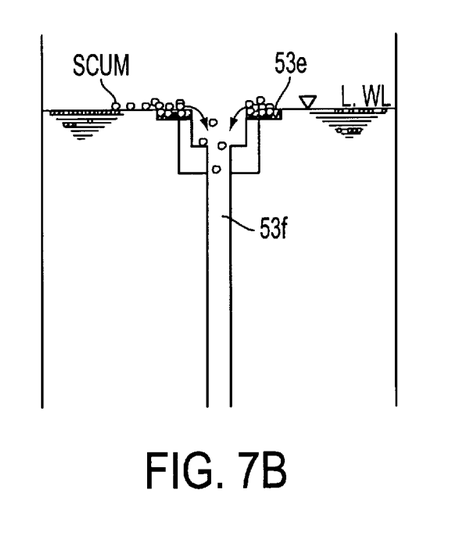

FIGS. 7A and 7B illustrates in more details the scum skimmers 53*b* and 54*b* which are to be installed in the first and second sediment separation chambers. The water level in the first and second sediment separation chambers varies in response to turning ON or OFF of the water pump in the active circulation chamber 16, so that the respective scum skimmers 53*b* and 54*b* should move up or down in response to changes in the water level by utilizing buoyant heads 53*e* (for example, made of form polystyrene) instead of fixed heads. The scum flowing on the water level is therefore sucked by scum suction tubes 53*f,* without influence of changes in water level, and sent back to the active circulation chamber 16. As a result, the water reservoir for supplying water to the toilets may constantly hold water clear of the solid wasters including the scum.

A water conduit 53*a* of a rectangular frame shape is disposed in a horizontal direction to cover an internal periphery of the first sediment separation chamber 53. The water conduit 53*a* has over the whole of its inner peripheral wall inlet openings into which the treated water flows. The treated water flowing into the water conduit 53*a* is then fed to the second sediment separation chamber 54 via a water connection pipe 53*c*.

Similarly, a water conduit 54*a* of a rectangular frame shape is disposed at an upper level of the second sediment separation chamber 54 and the treated water flowing into the water conduit 54*a* is fed to the water reservoir 56.

With the aid of an air lift pump 65 (see FIG. 5), the treated water fed to the water reservoir 56 is constantly supplied to the urinals 21, the Western-style toilet 31 and the Japanese-style toilets 32 and 33. When the toilet systems are installed in connection with the water reservoir 56, water pipes are connected to a water pipe which supplies clean water. Therefore, if the volume of water stored in the water reservoir 56 is short, the clean water is supplied from the utility water pipe at an appropriate timing. The sink 17 is also supplied with fresh water from the utility water pipe 56.

Figure 5:
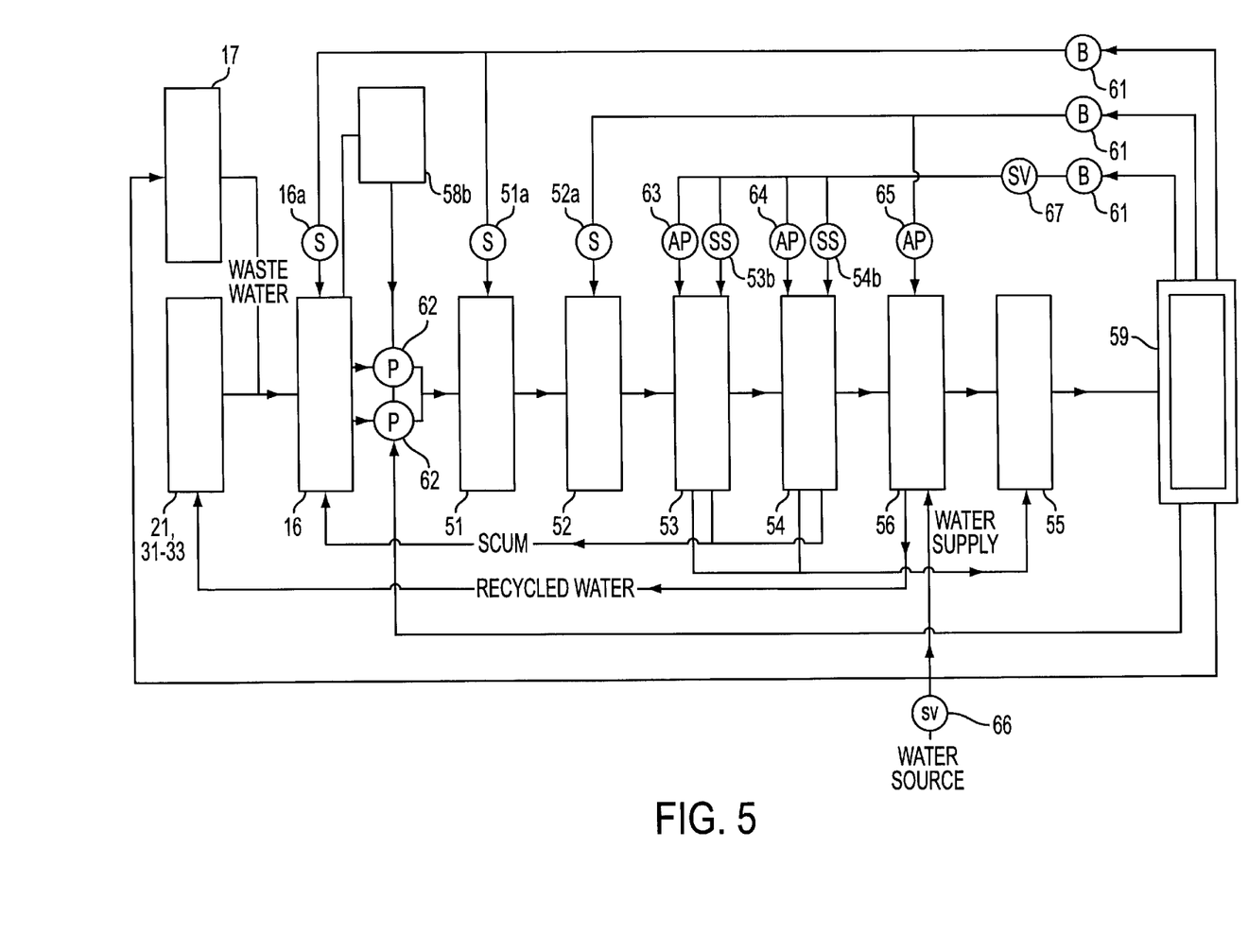
FIG. 5 is a block diagram showing a control system in the waste collection and treatment system as shown in FIG. 1.

FIG. 5 illustrates a block diagram showing a control system for the toilet housing and waste collection and treatment system according to the present invention. The control panel 59 in the machine room 58 controls the individual ones the three blowers 61 in the machine room 58 and the couple of the water pumps 62 in the water convey chamber 58b. The control panel 59 also controls a solenoid valve 66 disposed in a pipe connected to the water pipe for supplying the clean water to the water reservoir 56 and a solenoid valve 67 for selective supply of air from the blowers 61 to the air lift pump 63 or 64 in the first or second sediment separation chamber 53 or 54 and selective supply to the scum skimmer 53b or 54b.

It is noted that one of the blowers 61 in the machine room 58 is arranged to constantly supply air to the air dispersion tubes 16a and 51a in the active circulation chamber 16 and the first active water chamber 51. Another one of the blowers 61 is arrange to constantly supply air to the air dispersion tube 52a in the second active water chamber 52 and to constantly supply air to the air lift pump 65 for supply of the treated water in the water reservoir 56 to active circulation chamber 16. Still another one of the blowers 61 is to selectively supply air to either of the air lift pumps 63 and 64 in the first and second sediment separation chambers 53 and 54 or the scum skimmers 53b and 54b in the first and second sediment separation chambers 53 and 54, with the aid of operation of the solenoid valve 67. The solenoid valve 67 usually supplies air from the blowers 61 to the scum skimmers 53b and 54b in the first and second sediment separation chambers 53 and 54 and switches only if the solid wastes in the first and second sediment separation chambers 53 and 54 are to be fed to the sediment storage chamber 55.

The above described toilet housing and waste collection and treatment system may be loaded on a 4 ton truck or other vehicles and transported to any place by emptying the active circulation chamber 16, the water convey chamber 58b, the first and second active water chambers 51 and 52, the first and second sediment separation chambers 53 and 54, the sediment storage chamber 55 and the water reservoir 56 and then utilizing hanging fixtures 12g in the side walls 12c and 12d in the housing 10. Once the toilet housing has been transported to a site of an entertainment event or construction, the toilet housing may be placed at any desirable location. Then, an appropriate volume of water is fed to the active circulation chamber 16, the water convey chamber 58b, the first and second active water chambers 51 and 52, the first and second sediment separation chambers 53 and 54, the sediment storage chamber 55 and the water reservoir 56 and an appropriate volume of carrier particles holding the aerobic microorganisms is thrown into the first and second active water chambers 51 and 52.

With the aid of the air lift pumps 65 driven by the blower 61, the water in the water reservoir 56 constantly runs through the urinals 21, the Western-style toilet 31 and the Japanese-style toilets 32 and 33 and then flows down to the active circulation chamber 16. Accordingly, the urinals 21, the Western-style toilet 31 and the Japanese-style toilets 32 and 33 are kept clean and sanitary with the water supply from the water reservoir 56. Wastes thrown through the urinals 21, the Western-style toilet 31 and the Japanese-style toilets 32 and 33 are fed down to the active circulation chamber 16 together with the water fed from the water reservoir 56.

There are disposed the air dispersion tubes 16a in the active circulation chamber 16 so that the wastewater including the wastes thrown is exposed to air constantly fed from the blowers 61 to prevent odor from rising from the wastewater in the active circulation chamber 16.

The solid wastes in the active circulation chamber 16 and the wastewater, which are subjected to the air exposure treatment, are forced to flow via an opening 14a in the separation wall 14 into the water convey chamber 58b below the machine room 58 and then into the first active water chamber 51 with operation of the water pump 62. The couple of the water pumps 62 in the water convey chamber 58b are alternatively operable when a level of the wastewater in the water convey chamber 58b reaches a predetermined level.

Disposed at a lower level of the first active water chamber 51 are air dispersion tubes 51a too which air is constantly supplied by the blowers 61. The air fed through the air dispersion tubes 51a causes the wastewater to circulate in the first active water chamber 51 in which the wastewater is purified through the three-phase flowing structure including water, air and the carrier particles including aerobic microorganisms in the first active water chamber 51. The wastewater purified through the first active water chamber 51 or treated water is then fed to the second active water chamber 52 via the connection tube 51b and subjected to the same purifying treatment in the second active water chamber with the aid of the three-phase flowing structure.

Once the wastewater has been continuously subjected to the purifying treatment twice in the first and second active water chambers 51 and 52 through the three-phase flowing structure, the treated water in the second active water chamber 52 is fed to the first sediment separation chamber 53 via the connection pipe 52b.

In the first sediment separation chamber 53, scum of relatively small specific gravity floats on the water surface and the solid wastes of relatively large specific gravity settle down to the bottom of the chamber 53. The scum floating on the water surface in the first sediment separation chamber 53 is sucked into a scum skimmer 53b by lowering the specific gravity of the wastewater in the scum skimmer 53b through the utilization of air supplied by the blowers 61. The sucked scum is fed back to the active circulation chamber 16. When the sediment is accumulated on the bottom of the first sediment separation chamber 53, the solenoid valve 67 is switched so that the sediment on the bottom travels to the sediment storage chamber 55 via the inlet tube 63a of the air lift pump 63 in response to the air supplied by the blowers 61.

The solid wastes are settled and separated in the sediment separation chamber 53 and the treated water free of the scum overflows from the first sediment separation chamber 53 to the second sediment separation chamber 54 by way of the water conduit 53a and the connection tube 53c. The wastewater or the treated water is subjected to the same treatment in the second sediment separation chamber and the treated water clear of the scum overflows from the second sediment separation chamber 54 to the water reservoir 56 by way of the water conduit 54a and the connection tube 54c.

As discussed above, the wastewater is continuously purified through the three phase flowing structure in the first and second active water chambers 51 and 52 and cleaned of the solid wastes including the scum through the first and second sediment separation chambers 53 and 54 and eventually fed to and stored in the water reservoir 56. Therefore, the treated water in the water reservoir 56 is completely cleaned and may be used for any purposes except for drinking water. The urinals 21, the Western-style toilet 31 and the Japanese-style toilets 32 and 33 are constantly supplied with the treated water from the water reservoir 56, whereas the sink 17 is also constantly supplied with the treated water from the same source.

Whenever the sediment settled in the sediment storage chamber 55 has been accumulated to a certain level, it is thrown out through the use of a sewage truck with vacuum sucking function or other means.

As seen from FIG. 5, the water recycling system and the air dispersion apparatus are controlled by the two solenoid valves or electromagnetic valves 66 and 67 (marked "SV") and its associated timer. A timer in the water reservoir 56 controls the electromagnetic valve 66 in a pipe that runs from a water source (for example, utility water) to the water reservoir 56. When the water level in the water reservoir 56 gets too low due to prolonged use or evaporation, the electromagnetic valve 66 opens allowing water from the water source to replenish the water reservoir 56.

Another timer regulates the electromagnetic valve 67 in the air dispersion pipes. In order to regularly send the sediment settled at the bottom of the first and second sediment separation chambers 53 and 54 to the sediment storage chamber 55, a bypass path including the electromagnetic valve 67 is formed in air pipes of the blowers 61. The air blow in the blower 61 is automatically switched at a particular day and time selected by the timer so that the sediment is sent to the storage chamber 55 with operation of the air lift pumps 63 and 64 during that particular day and time.

Moreover, if the carrier particles in the first and second active water chambers 51 and 52 run short due to flow to the first sediment separation chamber 53 or other reasons, new carrier particles are added to the first and second active water chambers 51 and 52.

It is obvious to those skilled in the art that arrangements of the urinals and toilets and sink in the toilet room 10*a* may be modified or changed. It is also obvious that whereas the two active water chambers and the two sediment separation chambers are used in the above illustrated embodiments, only one of each of those chamber may be enough for a particular intended use and a particular requirement.

Figure 8:
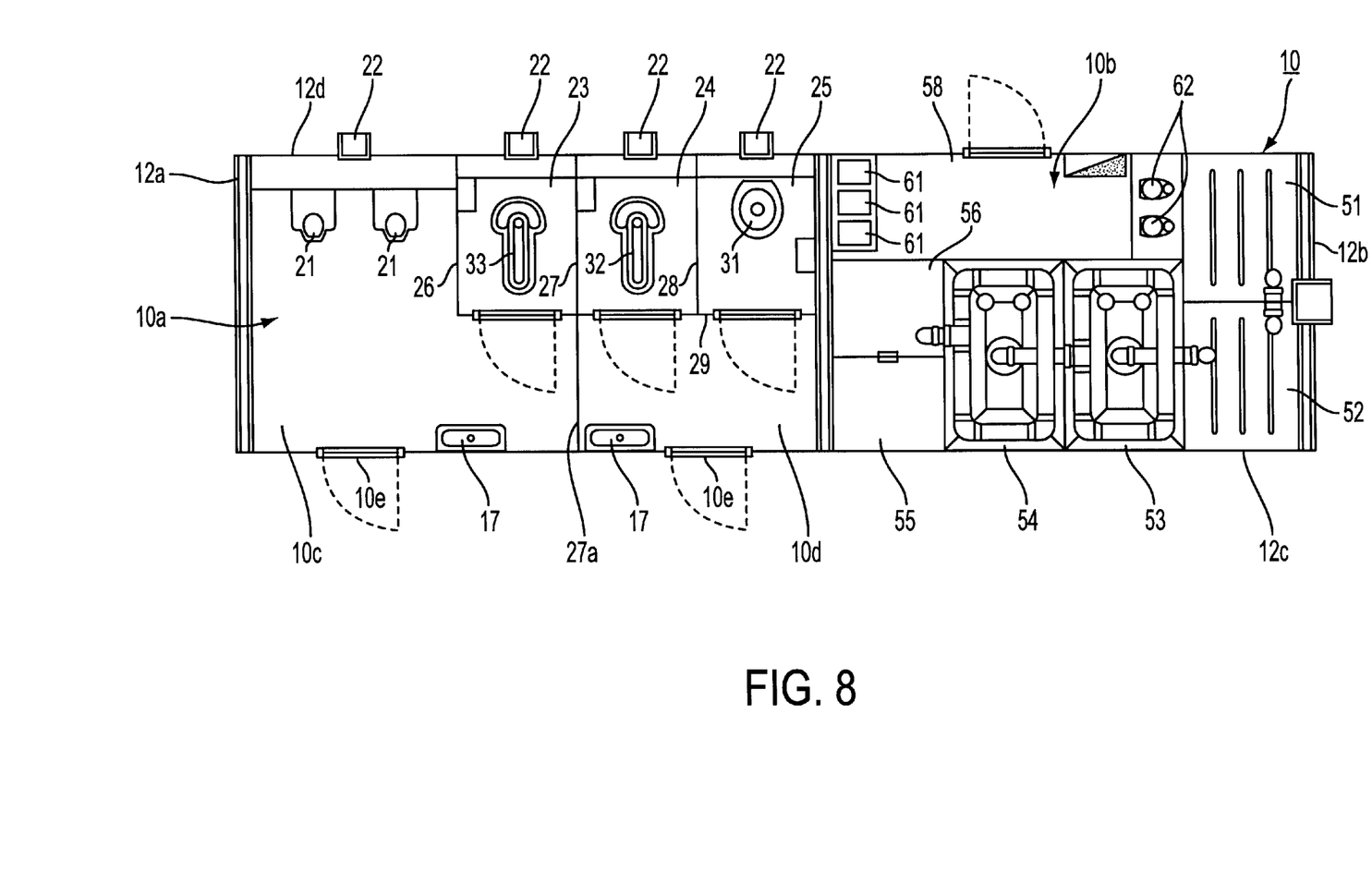
FIG. 8 is a top sectional view of a second embodiment of the waste collection and treatment system constructed in accordance with the principles of the present invention.

As seen in FIG. 8, an additional separation wall 27*a* may be provided along the lateral partition 27 between the stalls 23 and 24 including the Japanese-style toilets 32 and 33 respectively to divide the toilet room 10*a* into a men's room 10*c* and women's room 10*d*. An entrance 10*e* is formed in the side wall 12*c* for each of the men's room 10*c* and the women's room 10*d* and a sink 17 is provided in the side wall 12*c* adjacent to the entrance 10*e* for each of the two rooms 10*c* and 10*d*.

As explained in more details above, the toilet housing and waste collection and treatment system embodying the present invention may be transported to and installed at any desired location and kept clean and sanitary without any fear of odor generation and without need for discharging the treated water to the outside of the toilet housing thanks to its water flushing and recycling structure. Completely purified water is constantly fed to the toilets to eliminate the possibility of attachments of the scum and keep the toilets in clean and sanitary state. The treated water may be used for hand washing. Because the treated water constantly flows through the toilets, the toilet system is simple in structure and easy to maintain due to no valve involved.

What is claimed is:

1. A toilet waste collection and treatment system, comprising:

a housing having a circulation chamber;

a plurality of toilets connected to a network of pipes, with a volume of water being constantly circulated through said network of pipes;

means for purifying said volume of water;

means for separating and removing waste or other solid materials from said volume of water; and means for circulating a volume of air through the circulation chamber of said housing, wherein said purifying means, said separating means and said circulating means are provided as a single unit in said housing and said toilets are also provided in said housing, and wherein said network of pipes includes an electromagnetic valve for replenishing water when the volume of water runs short.

2. The toilet waste collection and treatment system of claim 1, wherein said means for circulating a volume of air includes a regulator for controlling the flow of said volume of air through the waste collection and treatment system.

3. The toilet waste collection and treatment system of claim 2, wherein said regulator is an electromagnetic valve.

4. The toilet waste collection and treatment system of claim 1, wherein said means for purifying said volume of water includes a regulator for controlling the flow of said volume of water through the waste collection and treatment system.

5. The toilet waste collection and treatment system of claim 4, wherein said regulator is an electromagnetic valve.

6. The toilet waste collection and treatment system of claim 1, wherein said means for separating and removing waste is a 60 degree angle hopper form.

7. The toilet waste collection and treatment system of claim 1, wherein said means for separating and removing waste is a scum skimmer.

8. The toilet waste collection and treatment system of claim 1, wherein said means for circulating air through the circulation chamber of said housing is a blower attached to an air dispersion pipe.

9. A toilet waste collection and treatment system, comprising:

a tank, having an inner circulation chamber;

a connection between said tank and a toilet house, said connection being for the movement of waste and water between said tank and said toilet house;

means for purifying water;

means for separating and removing waste from water; and means for circulating a volume of air through said inner circulation chamber; and wherein the connection includes network of pipes includes an electromagnetic valve for replenishing water when the volume of water runs short.

10. A toilet waste collection and treatment system, comprising:

a housing having a circulation chamber;

a plurality of toilets connected to a network of pipes, with a volume of water being constantly circulated through said network of pipes;

means for purifying said volume of water;

means for separating and removing waste from said volume of water;

means for circulating a volume of air through the circulation chamber of said housing; and means for mounting said housing on a vehicle such that said waste collection and treatment system is made transportable;

wherein said network of pipes includes an electromagnetic valve for replenishing water when the volume of water runs short.

11. A transportable toilet housing and waste collection and treatment system, comprising:

a housing, an active circulation chamber for receiving wastes conveyed from a toilet and exposing the wastes to air together with wastewater, an active water chamber for receiving the wastewater subjected to air exposing in the active circulation chamber and purifying the wastewater through a three-phase flowing structure including water, air and carrier particles holding aerobic microorganisms as filtering material, a sediment separation chamber for receiving the treated water purified in the active water chamber and settling down and separating solid materials from the treated water, a water reservoir for receiving the purified water after removed of the solid materials through the sediment separation chamber, means for supplying the treated water from the water reservoir to the toilet, and a sediment storage chamber for receiving and storing the solid materials settled down to a bottom of the sediment separation chamber, wherein the active circulation chamber, the active water chamber, the sediment separation chamber, the water reservoir and the sediment storage chamber is housed as a single unit within the housing and the toilet are also installed in the housing; and wherein the means for supplying the treated water includes an electromagnetic valve for replenishing water when the volume of water runs short.

12. A transportable toilet housing and waste collection and treatment system, comprising:

a housing including a toilet, an active circulation chamber for receiving wastes conveyed from the toilet and exposing the wastes to air together with wastewater, an active water chamber for receiving the wastewater subjected to air exposing in the active circulation chamber and purifying the wastewater through a three-phase flowing structure including water, air and carrier particles holding aerobic microorganisms as filtering material, a sediment separation chamber for receiving the treated water purified in the active water chamber and settling down and separating solid materials from the treated water, a scum skimmer provided in the sediment separation chamber for removing floating scum from the treated water, the scum removed being fed back to the active circulation chamber, a water reservoir for receiving the purified water after removed of the solid materials through the sediment separation chamber, means for supplying the treated water from the water reservoir to the toilet, and a sediment storage chamber for receiving and storing the solid materials settled down to a bottom of the sediment separation chamber;

wherein the means for supplying the treated water includes an electromagnetic valve for replenishing water when the volume of water runs short.

13. The transportable toilet housing and waste collection and treatment system of claim 12 wherein said scum skimmer includes a buoyant head which floats on a surface of the treated water in the sediment separation chamber.

14. A transportable toilet housing and waste collection and treatment system, comprising:

a housing, an active circulation chamber for receiving wastes conveyed from a toilet and exposing the wastes to air together with wastewater, first and second active water chambers connected together for receiving the wastewater subjected to air exposing in the active circulation chamber and purifying the wastewater through a three-phase flowing structure including water, air and carrier particles holding aerobic microorganisms as filtering material, first and second sediment separation chambers connected together for receiving the treated water purified in the first and second active water chamber and settling down and separating solid materials from the treated water, a scum skimmer provided in the first and second sediment separation chambers for removing floating scum from the treated water, the scum removed being fed back to the active circulation chamber, and a water reservoir for receiving the purified water after removed of solid materials including the scum through the first and second sediment separation chamber, means for supplying the treated water from the water reservoir to the toilet, and a sediment storage chamber for receiving and storing the solid materials settled down to a bottom of the sediment separation chamber;

wherein the means for supplying the treated water includes an electromagnetic valve for replenishing water when the volume of water runs short.

15. The transportable toilet housing and waste collection and treatment system of claim 12, wherein the interior of the housing is divided into a machine including the active water chamber, the sediment separation chamber, and the water reservoir and a toilet room including the toilet.

* * * * *